United States Patent [19]

Genequand et al.

[11] 4,332,775
[45] Jun. 1, 1982

[54] HYDROGEN GENERATOR UTILIZING SOLAR ENERGY TO DISSOCIATE WATER

[75] Inventors: Pierre Genequand, Moillebeau-Parc; Daniel M. Gross, Carouge, both of Switzerland

[73] Assignee: Battelle Memorial Institute, Columbus, Ohio

[21] Appl. No.: 200,618

[22] PCT Filed: Nov. 3, 1978

[86] PCT No.: PCT/CH78/00036
§ 371 Date: Jul. 3, 1980
§ 102(e) Date: Jun. 30, 1980

[87] PCT Pub. No.: WO80/00957
PCT Pub. Date: May 15, 1980

[51] Int. Cl.³ ............... G05D 16/02; B01J 19/12; C01B 13/00; C01B 3/06
[52] U.S. Cl. .................. 422/112; 422/186; 422/198; 422/209; 422/186.3; 423/579; 423/648 R
[58] Field of Search ........ 422/112, 186, 198, 209; 423/579, 648 R; 250/527

[56] References Cited

U.S. PATENT DOCUMENTS 4,019,868  4/1977  Sebacher et al. ............ 423/648 R
4,053,576  10/1977  Fletcher ........................ 423/579
4,071,608  1/1978  Diggs ............................ 423/579
4,233,127  11/1980  Monahan ..................... 422/186 X

OTHER PUBLICATIONS

Fletcher, E. A. et al.; "Hydrogen and Oxygen from Water"; Science, vol. 197, 9/77, pp. 1050–1056.
Nakamura T.; "Hydrogen Production from Water Utilizing Solar Heat at High Temperatures", Solar Energy; vol. 19, pp. 467–475.

Primary Examiner—Barry Richman
Attorney, Agent, or Firm—Philip M. Dunson

[57] ABSTRACT

Hydrogen is produced by dissociation of water in a rotary tubular reactor (1) having a receiving end covered by a cap (2) transparent to solar radiation and provided with a small window (12) connecting a collecting chamber (3) to an opaque insulated heating chamber (5).

The tubular reactor (1) constitutes a "black chamber" provided with two series of tubes (7, 8) for heating and dissociating the water. Tubes (7) have a porous section (7a) for separating hydrogen by molecular diffusion according to Knudsen's principle.

The concentrated solar radiation entering through the small window (12) falls on one end of the tubes (7, 8) and is largely absorbed by multiple reflections on these tubes.

A slow rotation of the reactor (1) enables the bending forces and stresses due to the weight to be compensated.

18 Claims, 5 Drawing Figures

HYDROGEN GENERATOR UTILIZING SOLAR ENERGY TO DISSOCIATE WATER

TECHNICAL FIELD

The present invention relates to the production of hydrogen using solar energy to dissociate water.

PRIOR ART

It has already been proposed to dissociate directly water flowing over a surface heated by concentrated solar radiation, and collect the hydrogen and oxygen.

The state of the art in this field may be illustrated by the following publications:

(1) The article by E. A. Fletcher, entitled: "Hydrogen and Oxygen from Water", and published in the review "Science", Vol. 197, Sept. 9, 1977, pages 1050–1056.

(2) U.S. Pat. No. 4,053,576 to E. A. Fletcher.

(3) U.S. Pat. No. 4,019,868 to D. E. Sebacher.

(4) The article by T. Nakamura entitled: "Hydrogen Production from Water utilising Solar Heat at high Temperatures" and published in the review "Solar Energy", Vol. 19, pages 467–475, by Pergamon Press in 1977.

(5) Belgian Pat. No. 845,009 to the C.G.E.

The article by E. A. Fletcher mentioned in (1) above describes more particularly the following:

Direct concentration of solar radiation onto a molecular diffusion porous membrane (operating under Knudsen flow conditions).

Dissociation of water by passage through the membrane thus heated directly by the concentrated solar radiation.

Partial separation of hydrogen and oxygen by selective molecular diffusion in this membrane.

Compression of the vapours enriched in $H_2$ and $O_2$ respectively, after having cooled the vapours to a low temperature, and separation by $H_2O$ by condensation so as to recover $H_2$ and $O_2$ under pressure.

Preheating of the water to be dissociated, by countercurrent heat exchange with the vapours enriched in $H_2$ and $O_2$ and superheated by passage through the said membrane.

Use of a refractory porous membrane formed from $ThO_2$.

OUTLINE OF THE INVENTION

The main advantage of using concentrated solar radiation to effect the direct dissociation of water is that in principle it enables high thermodynamic yields at high temperature to be obtained.

This advantage is however restricted by the refractory construction materials at present available. In fact, at the present time there are no refractory materials which would be capable of withstanding very high temperatures, for example of 3000° K. or above, as well as chemical attack and mechanical constraints at such high temperatures.

Consequently, one problem that needs to be solved in this case is to ensure as far as possible compatibility between the collection of the heat energy, the dissociation of the water, and the separation of the dissociated products.

Thus, for example, it is possible to operate at 2500° K. under a reduced pressure of 0.1 atmosphere so as to provide an acceptable degree of dissociation of the order of 20%. At the same time this also enables the thermal and mechanical constraints to which the heated refractory materials are subjected to be reduced.

However, the mass flux of a gas diffusing across a porous wall increases as a function of the pressure difference across this membrane, with the result that the operation of the generator at very low pressures reduces the flow rate of the gas that is consequently separated. It is nevertheless possible to take account of this reduction during separation by molecular diffusion, as will be seen hereinafter.

In addition, in order to ensure a good collection efficiency of the concentrated solar radiation, of the order of 80% for example, the surface absorbing this concentrated radiation should not re-emit an excessive amount of the absorbed energy, i.e. it should re-emit at most 20% for such a collection efficiency of 80%.

Nevertheless, the radiation flux re-emitted by a wall heated to 2500° K. is of the order of 200 W/cm$^2$. Consequently, a collection efficiency of 80% would only be achieved if the incident concentrated radiation flux $I_{mc}$ were equal to 1000 W/cm$^2$, which corresponds to a concentration 10,000 times greater than that of the solar radiation.

Consequently, assuming that the solar concentrator intercepts the solar radiation over a surface area of 50 m$^2$, and concentrates the radiation 10,000 times to provide a collection efficiency of 80% as mentioned above, the surface illuminated by this concentrated radiation should not exceed 50 cm$^2$. This clearly imposes a limit on the collecting surface that could be heated directly by the concentrated solar radiation, while at the same time ensuring a good collection efficiency of the incident radiation.

Moreover, the heated collecting surface should behave as far as possible like a black body so as to be able to absorb the maximum amount of the incident concentrated radiation and thereby ensure a good collection efficiency.

As regards the separation rate of the gases obtained from the dissociation of water, this generally decreases when the separation takes place at reduced pressure, as has already been mentioned above, which is scarcely compatible with the requirement of having a reduced collecting surface mentioned in connection with the collection efficiency.

The separation of the gases by diffusion under Knudsen flow conditions through a porous wall has a particular advantage in this connection however, since it provides the possibility of compensating a reduction in the pressure by an increase in the diameter of the pores involved in the diffusion. A high mass flow may thus be guaranteed during the separation, even if the latter takes place at very low pressures.

In fact, the maximum diameter of the pores of a porous wall serving for the selective molecular diffusion varies as a function of the mean free path of the diffusing gas, and thus inversely to the pressure p.

The molecular diffusion flow rate under Knudsen flow conditions along a tube is expressed by the following equation:

$$dn/dt = \frac{4}{3} \frac{r^3}{L} \sqrt{\frac{2\pi}{MRT}} \Delta p \tag{1}$$

in which:

dn/dt is the diffusion flow rate expressed in moles/sec;
r is the radius and L is the length of the tube;
$\Delta p$ is the pressure difference;
M is the molecular weight of the diffusing gas; and
R is the universal gas constant.

Now, if a uniformly porous wall is compared to a uniform arrangement of juxtaposed tubes whose radius r is equal to the average radius of the pores and whose length L corresponds to the thickness of this wall, the molecular diffusion flow rate across this wall may be given approximately by the following equation derived from equation (1) above:

$$dn/dt = \frac{8}{3} \frac{rS}{L} \cdot \frac{\epsilon \Delta p}{\sqrt{2MRT}} \quad (2)$$

in which:
r is the average radius of the pores;
S is the external surface area, L is the thickness and $\epsilon$ is the porosity (empty volume/total volume) of the porous wall.

The following conditions will now be assumed by way of example:
The said porous wall has a thickness L of 3 mm, pores of an average diameter of 40 $\mu$m (r=20 $\mu$m) and a porosity $\epsilon$ of 20%.

This wall is heated to a temperature T of about 2500° K.

The total pressure p at the inlet side is 0.1 atmosphere and the partial pressure of the hydrogen then corresponds to 0.02 atmosphere.

In this case, the hydrogen flow rate dn/dt under Knudsen flow conditions is calculated according to equation (2) above to be about 1 mole $H_2/m^2$ sec.

It will also be assumed by way of example that the hydrogen generator has a rated output of 50 kW, an overall thermal efficiency $\eta$ of 40%, and a degree of dissociation of 20%; this generator should produce hydrogen at a rate of 0.1 mole $H_2$/sec.

This would mean that the generator in question would have to have a surface area $S=0.1$ m$^2$ for the separation of the hydrogen by molecular diffusion under the afore-mentioned conditions.

However, it has already been calculated above that the concentrated incident radiation flux $I_{inc}$ necessary to ensure a good collection efficiency (80%) of the solar energy is about 1 kW/cm$^2$. This means that the said 50 kW generator would have to have a collecting surface $S_C$ of only 50 cm$^2$ as target to intercept the concentrated incident radiation (concentrated 10,000 times), in order to be able to operate under the afore-mentioned conditions.

Consequently, a direct concentration of the solar radiation on the surface of the wall intended for the dissociation and separation, such as has already been proposed, appears incompatible with a satisfactory operation of the hydrogen generator. In fact, and as follows from what has been said before, the surface S of the porous wall necessary to effect the separation by molecular diffusion will generally be several times greater than the collecting surface $S_C$ necessary to intercept the concentrated solar radiation with a good collection efficiency of the solar energy. Thus, the ratio $S/S_C$ is equal to 20:1 under the afore-mentioned conditions.

These conditions would moreover be able to constitute conditions moderately well adapted to the requirements of a satisfactory operation of the generator.

The hydrogen generators proposed hitherto are subject in addition to a further problem which is due to the fact that the wall onto which the solar radiation is directly concentrated does not at all have the properties of a black body.

In fact, the refractory materials proposed for the construction of the collecting surface, such as thorium dioxide, have a high reflecting power even at 2500° K.

The design and construction of an industrial hydrogen generator thus poses technical and economic problems which are all the more complex since the collection of the concentrated solar radiation, dissociation of the water and separation of the products should satisfy demands that are apparently contradictory.

The heat exchangers known at the present time are besides suitable at best for a partial preheating of the water to be dissociated, by indirect heat exchange with the superheated vapours enriched with $H_2$ and $O_2$ respectively.

In fact, such a preheating becomes more difficult to effect as the dissociation temperature of water is approached, and in fact becomes prohibitive at temperatures of the order of 2500° K., particularly on account of difficulties raised by the thermo-mechanical stability (problems of expansion) of the connection pieces between the preheating exchanger and the reactor as such.

The object of the present invention is to provide a hydrogen generator utilising solar energy to dissociate water, and which will take account of the afore-mentioned problems.

To this end, the generator constituting the subject of the invention such as defined in the claims comprises a rotary tubular reactor arranged in the form of an opaque, insulated reaction furnace containing the whole surface to be heated and having a small window for the admission of the concentrated solar radiation, so as to constitute a "black chamber".

The said reaction furnace is also provided with a plurality of thin refractory tubes serving to absorb the solar radiation in order to dissociate the water, and having a porous part for separating the hydrogen by molecular diffusion. The ratio of this porous part to the total surface area of the said tubes with which the furnace is equipped may thus be chosen more or less as desired and in the most appropriate manner according to the requisite operating conditions for the generator.

The said tubular reactor thus includes a completely integrated heat exchanger and receives the concentrated solar radiation which is trapped in the said furnace constituting a black chamber and there undergoes multiple reflections as well as a gradual absorption by the tubes. The absorption surface for the solar radiation may thus be increased, while at the same time exhibiting small heat losses.

Furthermore, the tubular reactor is arranged in such a manner that all the refractory tubular structures are subjected only to compressive forces.

The rotary tubular reactor is also arranged in such a way that it can follow the movement of the solar concentrator, which itself follows the movement of the sun, so that the reaction furnace can always align its window in the optimum position with regard to the centre of the concentrator.

On account of the fact that the refractory tubes are consequently slanted, these tubes are subjected to bending forces due to the effect of their weight.

In the present invention this disadvantage is obviated by a slow rotation of the reactor about its axis so as to compensate for the bending deformation of the tubes (creep).

So as to be able to compensate the longitudinal thermal expansions and contractions, the refractory tubes are mounted so that their end opposite the said window can move longitudinally and is associated with a servo-mechanism enabling the longitudinal compressive forces to which the tubes are submitted to be regulated.

It is also envisaged to arrange the tubular reactor constituting the subject of the invention in the form of a modular structure so as to limit the number of refractory elements of different shapes.

According to one variant of the invention, the refractory tubes as well as the refractory tubular wall containing the said tubes are formed by interlocking superimposed segments, which in particular avoids having to seal or bond the components heated to high temperatures. This is particularly useful in suppressing the undesirable effects of thermal shocks and differential expansions.

BRIEF DESCRIPTION OF THE DRAWINGS

The invention may be illustrated by way of example by means of an embodiment shown diagrammatically in the accompanying drawing, in which.

PREFERRED EMBODIMENTS OF THE INVENTION

Figure 1:
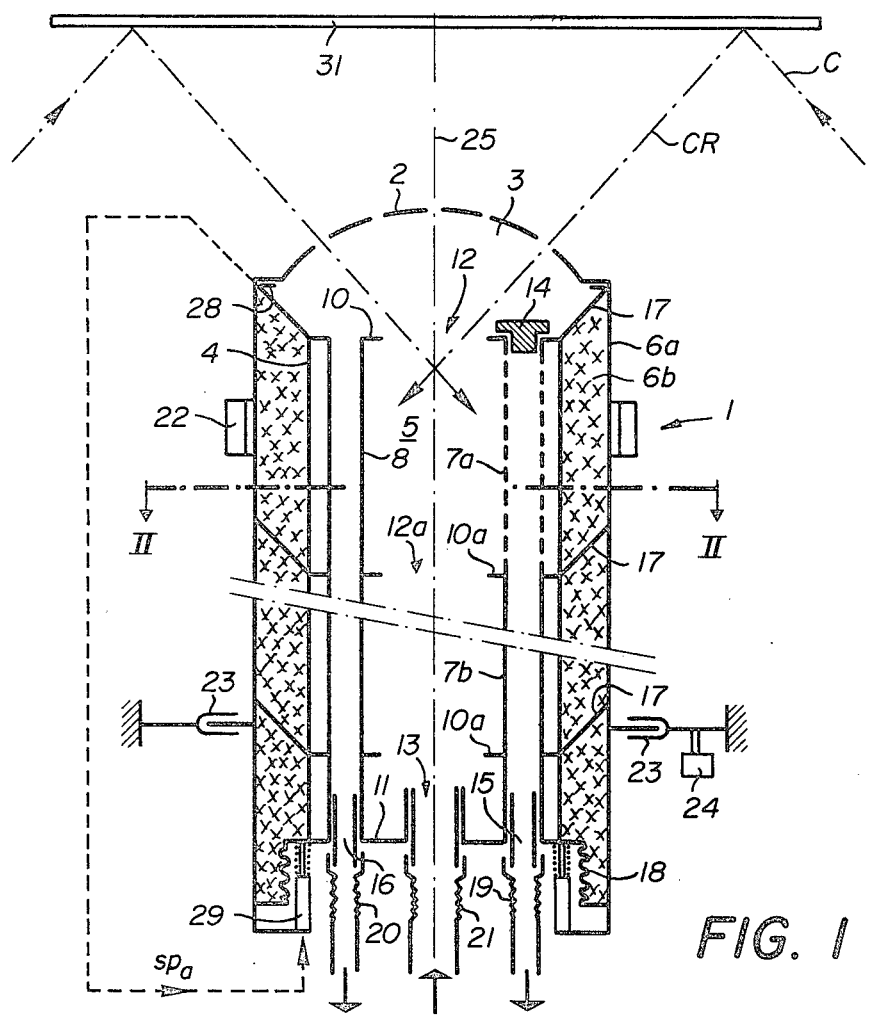
FIG. 1 shows a rotary tubular reactor represented in longitudinal section along I—I in FIG. 2.
Figure 2:
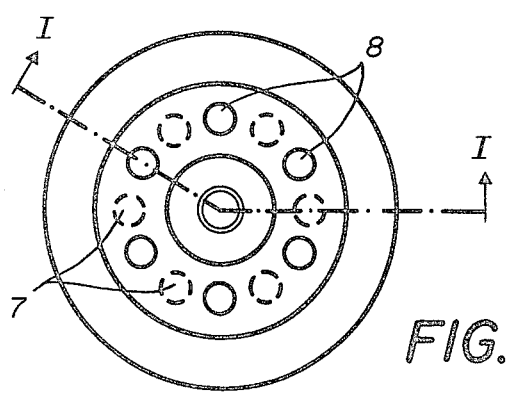
FIG. 2 shows a transverse section of this reactor along II—II in FIG. 1.

FIGS. 1 and 2 show, in longitudinal and transverse sections respectively, a hydrogen generator in the form of a rotary tubular reactor 1 comprising a heating chamber 5 bounded by an opaque refractory tubular wall 4 and by two transverse end walls 10, 11.

This dissociation chamber 5 is provided with two series of refractory tubes 7, 8, whose ends are mounted on the transverse walls 10 and 11 respectively.

This tubular reactor 1 has a receiving end for the concentrated solar radiation, which is covered by a transparent cap 2 and defines a collecting chamber 3 communicating with the heating chamber 5 via an axial window 12 provided in the transverse wall 10.

An inlet 13 for the water to be dissociated is arranged on the other transverse wall 11, situated at the opposite end of the tubular reactor 1.

The tubes 7 constituting a first series each comprises an upper end closed by a plug 14, a porous tubular section 7a and an impermeable section 7b extending along most of the tube 7 and constituting a preheating tube for the water to be dissociated.

The plug 14 separates the interior of the tube 7 from the collecting chamber 3. The porous section 7a is arranged in such a way as to permit the preferential molecular diffusion of the hydrogen from the upper part of the chamber 5 to the interior of the tube 7. A hydrogen outlet 15 is provided at the opposite end of each tube 7.

The porous section 7a of each of the tubes 7 of the said first series will have a porosity $\epsilon$ of between 10 and 30%, preferably of the order of 20%, and the average diameter of its pores will be between 5 and 50 $\mu$m, preferably of the order of 40 $\mu$m.

The tubes 8 constituting a second series are impermeable, and communicate respectively with the said collecting chamber 3 and with an oxygen outlet 16, and each forms a preheating tube for the water being dissociated.

The cap 2 is formed of a material impermeable to gas and transparent to concentrated solar radiation, for example vitreous silica. The cap is moreover arranged in such a way that it can withstand the external atmospheric pressure when the collecting chamber 3 is evacuated.

The insulating casing 6 is formed in the present case from an impervious external envelope 6a containing a refractory insulating material 6b, formed for example from zirconia ($ZrO_2$) fibres.

The opaque tubular wall 4 defining the boundaries of the dissociation chamber may be formed from any suitable refractory material, such as for example $ZrO_2$ or $ThO_2$, especially as regards its part that is intended to be heated to a very high temperature of the order of 2200° C. $Al_2O_3$ may if desired be used for its part that is heated to lower temperatures.

The tubes, 7, 8 will advantageously be fabricated from the same refractory materials, i.e. $ZrO_2$ or $ThO_2$, and possibly $Al_2O_3$.

Frustoconical spacers 17 of a refractory material ($ZrO_2$, $ThO_2$ or $Al_2O_3$) are also mounted on the exterior of the tubular wall 4 in such a manner that they can slide axially in the external envelope 6a and maintain this wall 4 in a coaxial position with respect to this envelope 6a.

The transverse wall 11 is formed from a movable plate connected in an impermeable manner via a bellows 18 to the lower end of the external envelope 6a of the tubular reactor 1.

The lower outlets 15 and 16 of the tubes 7 and 8 are also connected in an impermeable manner to flexible tubular connections 19 and 20 respectively. Moreover, the inlet 13 is connected in an impermeable manner to a flexible tubular connection 21 for supplying water to be dissociated.

The upper end wall 10 forms an annular spacing disc of refractory material fixed to the internal surface of the tubular wall 4, provided with a central hole 12 constituting the said axial window, and with holes for positioning the corresponding tubes 7 and 8.

The tubes 7 and 8 are maintained parallel to one another with the aid of the said upper wall 10 as well as a series of annular spacing discs 10a arranged in a similar manner on this end wall 10, but at different intermediate positions along the dissociation chamber 5. The holes 12a of these discs 10a moreover correspond to the axial window 12 of the end wall 10. This wall 10 and at least the discs 10a situated in the upper part of the reactor, particularly in the vicinity of the porous sections 7a of the tubes 7, are formed of a refractory material capable of withstanding the high temperatures required to dissociate the water, and are preferably formed from $ZrO_2$ or $ThO_2$. The spacing discs 10a, which are situated in the lower part of the reactor, are exposed to much lower temperatures and may be fabricated for example from Al$_2$O$_3$.

The rotary tubular reactor 1 described above is rotatably mounted on bearings 22 and 23 and is connected to a drive mechanism 24 which causes it to rotate slowly and at a regulable rate around its longitudinal axis 25. This drive mechanism 24 may comprise any suitable motor, and in the present case is arranged so that it imparts an alternating rotary movement to the reactor 1 corresponding to one complete revolution about its axis 25, in both directions of rotation. The rotational velocity of the reactor 1 may in this case be of the order of 1 revolution/minute for example.

Figure 3:
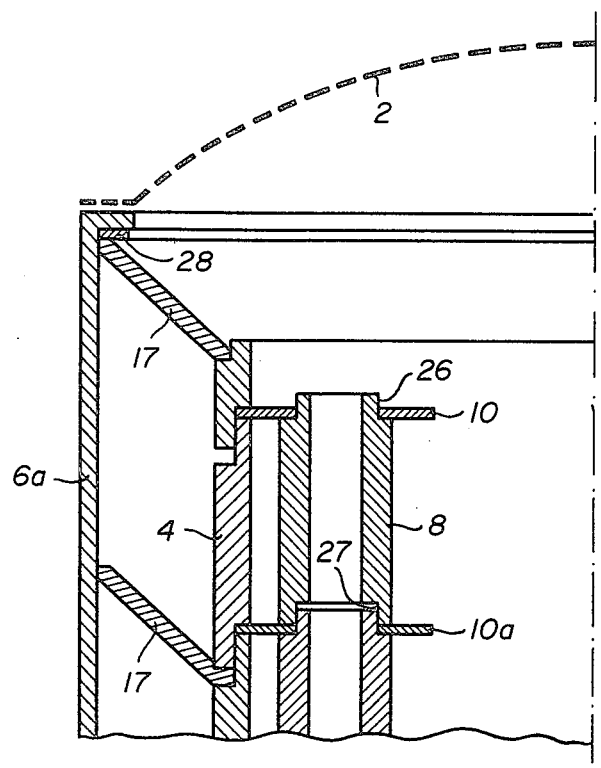
FIG. 3 shows in detail a mode of assembly for the refractory elements of the reactor according to FIG. 1.

FIG. 3 shows a detail of a preferred mode of assembly of the refractory elements 4, 7 and 8 of the reactor 1 described above with reference to FIGS. 1 and 2.

As can be seen from FIG. 3, the refractory tubular wall 4 as well as the refractory tubes 8 (and 7) are composed of tubular segments forming modules that can be assembled simply by interlocking with one another.

To this end, each segment of a tube 7 or 8 has, respectively, at its opposite ends an external constriction 26 and a corresponding internal enlargement 27 enabling the segment to interlock with the following segment. The discs 10 and 10a are perforated with holes of a diameter corresponding to the said constriction 26, in such a way that each disc rests on a shoulder of the corresponding constriction 26 of each segment of the tubes 7 and 8, and is thus sandwiched between the interlocked segments.

The tubular wall 4 is similarly composed of tubular segments forming interlocked modules between which the discs 10 and 10a as well as the frustoconical spacers 17 are respectively sandwiched.

As is shown diagrammatically in FIGS. 1 and 3, a pressure sensor 28 is arranged in such a manner at the upper end of the reactor 1, between the envelope 6a and the frustoconical spacer 17 connected to the tubular wall 4, that this sensor measures the axial pressure between this envelope and this wall, and transmits a corresponding pressure signal sp$_a$.

A servo-mechanism 29 is actuated by the said sensor 28, as is indicated diagrammatically by the dotted line 30 in FIG. 1. It is arranged between the lower movable wall 11 and the lower end of the envelope 6a, so as to regulate the relative axial position of the wall 4 and tubes 7, 8 with respect to this envelope 6a, as a function of the said pressure signal sp$_a$, and thus maintain a low predetermined axial pressure, of the order of 0.1 kg/cm$^2$ for example, corresponding to a low predetermined longitidinal compressive force acting on the tubular wall 4.

Finally, FIG. 1 shows a small reflector 31 serving to direct the solar radiation, concentrated 5000 to 10,000 times, through the said transparent cap 2 and axial window 12 of the chamber 5, and onto the upper part of the refractory tubes 7, 8.

This reflector 31 is part of a solar collecting-concentrating system, which will be described in more detail hereinafter.

Figure 4:
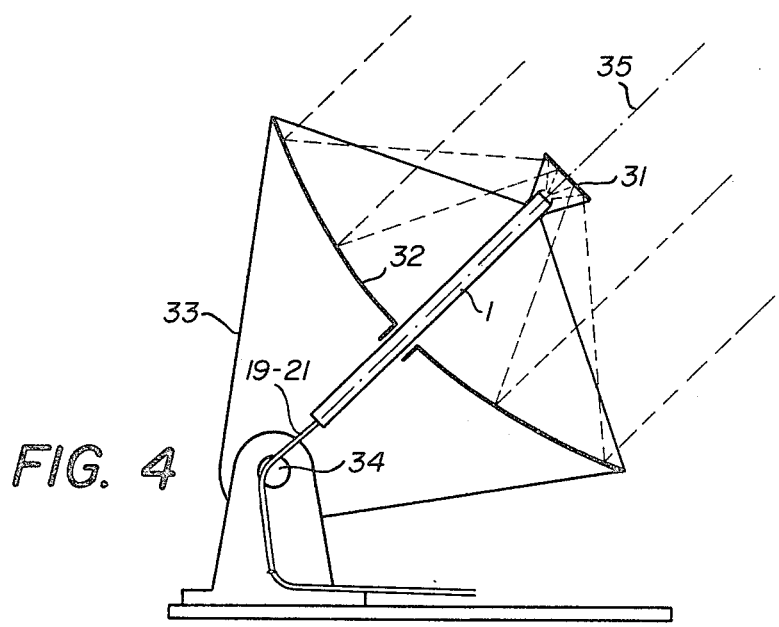
FIG. 4 shows a diagram of a collector-concentrator system including the reactor according to FIG. 1.

FIG. 4 shows a general diagram of the rotary tubular reactor 1 described above, associated with a solar collecting-concentrating system comprising a large mobile revolving parabolic reflector 32 which is mounted on a support 33 so as to be able to pivot about an axis 34 and thus follow the sun so as to receive the solar radiation parallel to its axis of symmetry 35.

As can be seen from FIG. 4, the tubular reactor 1 is mounted along this axis 35 of the large reflector 32 so that they can pivot together about the axis 34. The small reflector 31 is also arranged in a focal region of the large reflector 32, opposite the cap 2 and window 12 arranged at the receiving end of the reactor 1.

The flexible tubular connections 19 to 21 at the other end of the reactor 1 are also connected to a low temperature auxiliary system, which will be described below.

The rotary tubular reactor 1 described above and shown moreover in the diagram of FIG. 5 serves to ensure at the same time the preheating and dissociation of water as well as the separation of the dissociated products, by molecular diffusion under Knudsen flow conditions in the said porous tubular sections 7a, into two fractions H$_2$—H$_2$O and O$_2$—H$_2$O. These two fractions consist of water vapour enriched with gaseous hydrogen and gaseous oxygen respectively.

Figure 5:
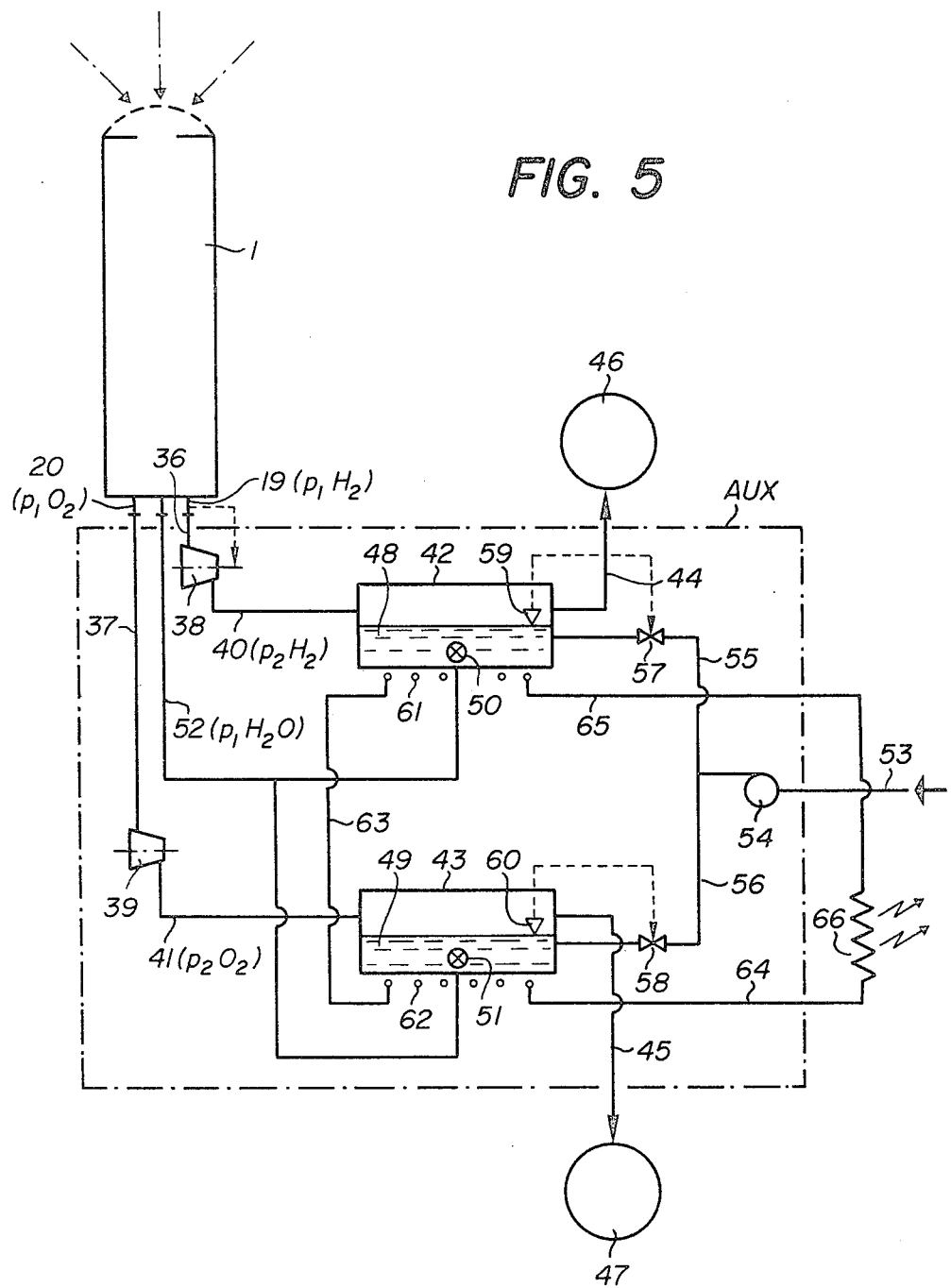
FIG. 5 shows a diagram of the hydrogen generator comprising the reactor according to FIG. 1 combined with an auxiliary low temperature system.

All the component parts of the hydrogen generator which are at a high temperature during its operation are thus assembled within this rotary tubular reactor 1 itself, which latter is moreover combined with a low temperature auxiliary system shown diagrammatically in FIG. 5.

As can be seen from the diagram in FIG. 5, the said tubular connections 19 and 20, which on the one hand are connected to hydrogen and oxygen outlets 15 and 16 respectively (FIG. 1), are on the other hand connected by evacuation lines 36 and 37 respectively to two compressors 38 and 39.

These two compressors 38 and 39 are provided with means for regulating their outputs so that their inlet pressures p$_1$H$_2$ and p$_1$O$_2$ respectively can be regulated, and correspond to the regulable admission rates of the said H$_2$—H$_2$O and O$_2$—H$_2$O fractions evacuated respectively from the reactor 1. These two fractions are compressed by the compressors 38 and 39 respectively and delivered at corresponding higher pressures p$_2$H$_2$ and p$_2$O$_2$ via lines 40 and 41 to two condensers 42 and 43.

The two condensers 42 and 43 serve respectively to condense the water vapour contained in the said H$_2$—H$_2$O and O$_2$—H$_2$O fractions so as thereby to separate the hydrogen and oxygen, which are then delivered respectively under pressure via respective outlet lines 44 and 45, for example to corresponding storage reservoirs 46 and 47.

These two condensers 42 and 43 contain respectively water baths 48 and 49 in which regulable pressure release valves 50 and 51 are arranged in such a manner that they can withdraw from each bath a controllable amount of water under pressure (p$_2$H$_2$, p$_2$O$_2$ respectively) and reduce the pressure of the water to a regulable sub-atmospheric pressure, resulting in the evaporation of the water. The amount of heat required for this evaporation in the pressure release valves 50 and 51 is thus provided by the baths 48 and 49 in which the said valves are immersed, with the result that these baths are consequently cooled.

The flashed water vapour thus obtained at the outlet of the valves 50 and 51 is recycled continuously under a regulable pressure p$_1$H$_2$O, through a recycle line 52 joined to the tubular connection 21, to the water inlet 13 (FIG. 1) to the rotary tubular reactor 1.

A make-up water feedline 53 provided with a pump 54 is also connected to two inflow lines 55 and 56 provided respectively with regulating valves 57 and 58 so as to be able to provide regulable amounts of make-up water to the two baths 48 and 49, and thereby compensate for the amount of water continually dissociated in the reactor 1.

These two regulating valves 57 and 58 for the make-up water may be automatically controlled by any suitable means, such as level sensors for the corresponding water bath, illustrated diagrammatically by the elements 59 and 60 and functionally associated with these valves 57 and 58, as is indicated diagrammatically by the dotted lines in FIG. 5. We are thus dealing in this case with a well-known type of level regulating device, such as is used to regulate the level of water in a boiler.

The condensers 42 and 43 are also associated respectively with an auxiliary cooling circuit, which is indicated diagrammatically by corresponding coils 61 and 62 connected by lines 63, 64 and 65 to a cold source 66. The latter enables all low temperature surplus heat to be evacuated from the afore-described auxiliary system (Aux), so as to ensure the condensation and thus the separation of all undissociated water contained in the said $H_2$—$H_2O$ and $O_2$—$H_2O$ fractions. This auxiliary cooling circuit 61 to 66 thus ensures in all cases the thermal balance of the whole of the afore-described generator, and enables hydrogen and oxygen to be recovered separately and water to be recycled.

The hydrogen generator described above with reference to FIGS. 1 to 5 may by way of example have the following characteristics:

External diameter of the reactor (1) = 30 cm
Total length of the reactor (1) = 5 m
Internal diameter of the wall 4 (chamber 5) = 18 cm
Distribution of 6 tubes 7 alternating with 6 tubes 8 over a circle 18 cm in diameter.
External diameter of the tubes 7, 8 = 2 cm, their wall thickness = 2 mm
and, their total length = about 5 m.
Length of the porous tubular section $7a$ = 30 cm
Diameter of the small reflector 31 = 1 m
Diameter of the large reflector 32 = 8 m.

The operation of the afore-described hydrogen generator may be explained in the following manner:

The working conditions for the functioning of the reactor 1 under permanent operation will be chosen as follows in the present case:

water vapour injection pressure
   $p_1H_2O = 0.25$ atmosphere;
oxygen suction pressure
   $p_1O_2 = 0.2$ atmosphere; $p_2O_2 = 10$ atmospheres;
hydrogen suction pressure
   $p_1H_2 = 0.025$ atmosphere; $p_2H_2 = 10$ atmospheres;
dissociation temperature $T_D = 2500°$ K.

In order to obtain economically the compression ratios corresponding to these pressures, Roots type compressors will for example be used.

The reactor 1 may be started by the following operations:

The compressors 38 and 39 are actuated, and the suction pressures are adjusted to a residual value less than the selected working pressures ($p_1H_2 = 0.025$ atmosphere; $p_1O_2 = 0.2$ atmosphere), for example to 0.005 atmosphere.

Water vapour is injected into the reactor at a pressure corresponding to saturation at ambient temperature (for example 0.05 atmosphere at 35° C.).

The concentrated solar radiation is applied progressively to the receiving end of the reactor 1, which is alternately turned by one complete revolution in one minute in both directions.

The reactor functions in the permanent operation mode when the temperature y is sufficiently high to allow the dissociation of the water, and when the condensers are sufficiently hot to enable the water vapour to be injected at the chosen working pressure, $p_1H_2O = 0.25$ atmosphere, which corresponds to $T_D = 2500°$ K., while the compressors 38 and 39 are adjusted to the corresponding working pressures, $p_1H_2 = 0.025$ atmosphere and $p_1O_2 = 0.20$ atmosphere, respectively.

Under these working conditions, a production of hydrogen of the order of 700 grams/hour is obtained for an incident solar flux of 50 kW.

The rotary tubular reactor according to the invention, such as described above, is combined with a parabolic reflector so as to be able to concentrate the solar radiation 5000 to 10,000 times in order for the reactor to achieve an acceptable efficiency at 2500° K.

The dimension of 8 m for the reflector diameter is the best value for adaptation to the standard supports provided for the heliostats of the revolving solar power stations.

This tubular reactor may constitute a modular unit having all suitable dimensions to ensure a high efficiency. Several modular units may moreover be connected to a central unit containing all the low temperature auxiliary systems, so as thereby to ensure any large production of hydrogen that may be required.

It is clear that the compressors 38, 39 and the corresponding condensers 42, 43 described above may be arranged in any suitable manner, for example in several successive compression and condensation stages.

The compressors 38, 39 may furthermore be driven by any suitable means, for example by turbines (not shown) actuated by the vapour obtained by auxiliary exchange means, serving in particular to cool the envelope $6a$ of the insulating casing 6, preferably in the vicinity of the receiving end of the reactor 1, or serving to cool the outlets 15 and 16 of the $H_2$—$H_2O$ and $O_2$—$H_2O$ fractions insufficiently cooled by their passage through the tubes 7 and 8.

Thorium dioxide, $ThO_2$, has particularly valuable advantages as refractory material for the construction of the parts heated to high temperature in the rotary tubular reactor forming the object of the present invention.

Thus, $ThO_2$ has a melting point of the order of 3500° K., which leaves a good margin of safety (about 1000° K.) above the working temperature $T_D$ of 2500° K. considered advantageous for the functioning of the rotary tubular reactor according to the invention.

The good compressive strength of $ThO_2$ at high temperature is advantageous, given the particular construction and mode of operation of the tubular reactor according to the invention, which essentially means that all its refractory tubular elements are only subjected to low compressive forces. In contrast, other constructions proposed in the state of the art, such as curved or plane porous membranes, would be subjected to much higher stresses, in particular to bending forces.

Moreover, $ThO_2$ is one of the refractory materials that is most stable and inert to oxidation and reduction by water vapour and its dissociation products at temperatures up to 3000° K.

$ThO_2$ thus ensures a good functioning under permanent operation mode of the tubular reactor according to the invention, that is to say without chemical reaction between $ThO_2$ and $H_2O$ and its dissociation products up to at least 2500° K.

Besides, $ThO_2$ is inert above 2000° K. with respect to various other solid oxides such as MgO, $ZrO_2$ and spinel, and accordingly the connection of $ThO_2$ tubes in the high temperature zone to tubes of the other oxides in the low temperature and medium temperature zones should not pose any particular problem.

$ThO_2$ is only a weak absorber of light in the visible spectrum. However, the incorporation of an additive such as $CeO_2$ in very small amounts ($\leq 1\%$) should be sufficient to ensure the absorption of the solar radiation by the multiple reflections that occur by virtue of the particular disposition of the tubular reactor according to the invention, namely multiple reflections on the one hand between the refractory tubes themselves, and on the other hand between these tubes and the refractory tubular wall that contains them. In fact, too strong an absorption of the solar radiation would be undesirable since it would promote thermal shocks, to which $ThO_2$ is relatively sensitive.

We claim:

1. A gas generator for producing hydrogen and oxygen from thermally dissociated water vapor, comprising
   a heat-insulated rotary tubular reactor (1) heated by solar energy in incoming radiation (CR) from the sun, comprising
   an inner chamber (5),
   inlet means (13) for providing water in the chamber,
   an axial upper end wall (2) facing the incoming radiation and having the form of a transparent cap for allowing the radiation to enter the inside of the reactor,
   a tubular side wall (4) and a flat lower end wall (11) made of refractory material capable of absorbing a substantial portion of the collected radiation so as to raise, during operation, the temperature in the inner chamber to a level sufficient to dissociate the water therein to form hydrogen and oxygen,
   means for separating the hydrogen from the oxygen, comprising a plurality of substantially vertically oriented refractory tubes (7,8) of which at least one (7) has a closed upper end (14) but a partially porous wall (7a) for letting the hydrogen preferentially penetrate therein, and another tube (8) has a solid wall and an open upper end for collecting the oxygen, and
   a lower end (15,16) of each tube being connected to means for evacuating and storing the gases formed and collected therein.

2. A gas generator according to claim 1, wherein the porous section (7a) of each porous-walled tube (7) comprises a refractory oxide having a porosity of about 10 to 30% and a pore diameter of about 5 to 50 μm.

3. A gas generator according to claim 1, comprising also a servo-mechanism (29) communicating with the lower end wall (11) and controlled by a pressure sensor (28) responsive to the axial pressure on the upper end of the tubular side wall (4) to maintain this pressure at a predetermined low value.

4. A gas generator according to claim 1, wherein the refractory side wall (4) is positioned by a plurality of frustoconical spacers (17) fixed to the external surface of this wall (4), between the latter and an external gas-tight enclosure (6a).

5. A gas generator according to claim 1, comprising also driving means (24) for imparting to the reactor (1) a rotational movement comprising a complete revolution of the reactor in one direction, then a complete revolution in the opposite direction, and so on alternately.

6. The gas generator of claim 1, wherein the refractory lower end wall (11) includes conduits for introducing water (13) into the reactor and for evacuating (15,16) the gases formed and collected therein, wherein said lower wall (11) supports the tubes (7,8) for collecting the gases formed and is supported by yieldable means (18); thus enabling the tubes to freely extend under heat by pushing said wall downward, which prevents possible deformation.

7. The generator of claim 1, wherein the tubes (7,8) are for collecting the gases formed, said tubes being arranged axially and distributed along a circle, with the hydrogen collecting tubes (7) positioned alternately between the oxygen collecting tubes (8).

8. The generator of claim 1, wherein only the upper part (7a) of each hydrogen collecting tube (7) is porous and enables this gas to pass therethrough, the lower part thereof, as well as each oxygen collecting tube (8), acting as preheating means for the water to be dissociated, such preheating occuring during contact with the hot walls thereof.

9. The generator of claim 1, comprising driving means (24) and coupling means (23) therefor for rotating the reactor (1) during operation to prevent bending and possible collapse of the tubes (7,8) at high temperature.

10. A gas generator according to claim 1 wherein the said refractory tubes (7,8) are fitted into holes in a plurality of annular spacers (10a) for maintaining the relative positions of these tubes (7,8).

11. A gas generator according to claim 1, wherein the refractory tubes (7,8) comprise thorium dioxide or zirconia at least along an upper part of each tube.

12. A gas generator according to claim 1 or 11, wherein the refractory tubes (7,8) are arranged alternately and distributed over a circle situated in the vicinity of the side wall (4).

13. A gas generator according to claim 1, wherein a reflector (31) is provided opposite the transparent cap (2) and positioned to receive a converging beam (C) of concentrated solar radiation and reflect the radiation in a reflected convergent beam (CR) directed through the transparent cap (2) and concentrated on a central window (12) in the reactor (1).

14. A gas generator according to claim 13, comprising also a parabolic reflector (32) having the same axis of symmetry (35) as that of the reactor (1) and that of the reflector (31), all being mounted integral with one another on a support (33); and means for pivoting the support to direct the parabolic reflector (32) toward the sun so as to receive the radiation parallel to its axis of symmetry, and to direct the converging beam of concentrated solar radiation (C) onto the reflector (31), and thus form a reflected converging beam (CR) concentrated on the central window (12) in the reactor (1).

15. A gas generator according to claim 14, wherein the reflectors (31,32) are constructed and arranged to concentrate the solar radiation at least about 5000 times.

16. A hydrogen generator according to claim 1, wherein the tubular wall (4) and the refractory tubes (7,8) are formed of sections of modular tubes whose opposite ends have respectively external constrictions (26) and corresponding internal enlargements (27) for interlocking adjacent sections with one another.

17. A gas generator according to claim 16, wherein the said refractory tubes (7,8) are fitted into holes in a plurality of annular spacers (10a) for maintaining the relative positions of these tubes (7,8).

18. A gas generator according to claim 17, wherein each said spacer (10a) is positioned between the interlocked ends of successive tube sections.

* * * * *